United States Patent Office 3,801,631
Patented Apr. 2, 1974

3,801,631
2'-HYDROXY-5'-[1-HYDROXY - 2 - (2-METHYL-1-PHENYL - 2 - PROPYLAMINO)ETHYL]METHANESULFONANILIDE AND ITS SALTS
William T. Comer and Herbert R. Roth, Evansville, Ind., assignors to Mead Johnson & Company, Evansville, Ind.
No Drawing. Filed Feb. 16, 1972, Ser. No. 229,202
Int. Cl. C07c 143/74
U.S. Cl. 260—501.19                                      6 Claims

ABSTRACT OF THE DISCLOSURE

2' - hydroxy-5'-[1-hydroxy-2-(2-methyl-1-phenyl-2-propylamino)ethyl]methanesulfonanilide is a potent anorexigenic agent and orally active bronchodilator.

FIELD OF THE INVENTION

This invention is in the field of carbon compound chemistry and deals specifically with the sulfonic acid amide 2' - hydroxy-5'-[1-hydroxy-2-(2-methyl-1-phenyl-2-propylamino)ethyl]methanesulfonanilide. This substance is referred to for convenience as MJ 9184. Its structural formula is given below.

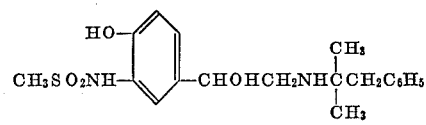

DESCRIPTION OF THE PRIOR ART

The following references relate to a broad genus of sulfonic acid amides of which the present substance is a newly synthesized member. It has a number of outstanding qualities as compared to its congeners.

(1) Aubrey A. Larsen et al., U.S. Pat. No. 3,341,584 patented Sept. 12, 1967.
(2) A. A. Larsen et al., Nature, vol. 203, No. 4951, pp. 1283–1284, Sept. 19, 1964.
(3) Robert H. Uloth et al., J. Med. Chem., 9, 88–97 (1966).
(4) A. A. Larsen et al., J. Med. Chem., 10, 462–472 (1967).

Reference No. 4 deals specifically with the sulfonanilides most closely related structurally to MJ 9184. One substance from this series, 2'-hydroxy-5'-(1 - hydroxy-2-isopropylaminoethyl)methanesulfonanilide (Compound No. 49 in the publication) was reported by the authors to be equivalent in potency to isoproterenol and to have been the subject of clinical evaluation as a bronchodilator. That substance has been referred to in the literature as MJ 1992 and as soterenol. Other members of the series are described by the authors as uterine relaxants, namely 2'-hydroxy-5' - [1 - hydroxy - 2-(4-methoxyphenethylamino)propyl] methanesulfonanilide and 2'-hydroxy-5'-[1-hydroxy-2-(1-phenoxy - 2 - propylamino)propyl]methanesulfonanilide. The same three substances are also referred to as vasodilators, smooth muscle relaxants, and as bronchodilators at Column 24 of the Larsen et al. patent cited above as reference No. 1.

SUMMARY OF THE INVENTION

The compound of the present invention is prepared according to the generalized method outlined in foregoing references Nos. 1 and 4. 5'-bromoacetyl-2'-hydroxymethanesulfonanilide is caused to react in a neutral organic solvent with α-α-dimethylphenethylamine and the resulting aminoacetylsulfonanilide is hydrogenated over a catalyst to provide the desired compound. Detailed procedures are given herein for this method. The invention relates to the compound per se, the salts of the compound, to therapeutic bronchodilator and anorexic processes using the compound and its salts, and to pharmaceutical compositions adapted for use in the therapeutic processes.

In various animal tests that are used to measure bronchodilator activity, MJ 9184 is from 1 to 100 times as potent as isoproterenol on a dosage weight basis, and it has the very important advantage of being effective on oral administration. Isoproterenol is not used orally because it is poorly absorbed orally. Of the 38 compounds having structures similar to MJ 9184 reported by Larsen et al. in reference No. 4 cited above, 36 are either inactive or possess but small fraction of the β-adrenergic stimulant (bronchodilator) activity of MJ 9184. The 35 structurally related compounds of reference No. 3 are many orders of magnitude less potent. In addition, MJ 9184 is an anorexigenic agent having a potency on a dosage weight basis 10 times that of amphetamine. It is thus an outstandingly active drug, both as an anorexigenic and as a bronchodilator. It also possesses analgesic activity.

One test referred to for estimating bronchodilator action in vitro in reference No. 4 involves removing the trachea from an adult guinea pig and suspending it in oxygenated salt solution at 37.5° C. Tissue activity is recored kymographically or electronically and the effect of test compounds introduced into the bath at various concentrations is determined. Isoproterenol at concentrations of 4 to 6 nanograms per milliliter reduces the spontaneous tonus of the tracheal smooth muscle in vitro by 75%. The activity of other compounds relative to isoproterenol is then estimated by determining the concentrations thereof which cause a 75% reduction in spontaneous tonus. The rat uterus is used similarly in an isolated tissue test in vitro to compare the β-adrenergic stimulant ability of various bronchodilator drugs. These tests are referred to in footnotes (d) and (e) of Table IV of reference No. 4 cited above. Considering relative potencies with isoproterenol arbitrarily assigned a value of 1, in the guinea pig trachea test, MJ 9184 hydrochloride has a value of 4 to 7, and in the rat uterus test a value of 1 to 6.

In a more sophisticated animal model employing the anesthetized dog with pre-established and sustained bronchoconstriction induced by intravenous infusion of serotonin, MJ 9184 hydrochloride was found to be approximately 100 times more potent than isoproterenol when administered intraduodenally. In this test, pulmonary airway resistance was measured to assess bronchoconstriction and bronchodilation. Cardiovascular effects were simultaneously measured and found to be substantially less than those which are concomitant to the intraduodenal administration of equiactive bronchodilator amounts of isoproterenol. This in vivo animal test comparison is considered particularly significant since the sustained bronchoconstriction induced resembles asthma, and intraduodenal drug dosing of the anesthetized animal is similar to oral administration to a conscious animal. MJ 9184 had the further advantage of a rapid onset of action, less than 5 minutes, and a long duration of action.

The method of Randall et al., J. Pharmacol. Exper. Therap., 129, 163–171 (1960) is suitable for demonstration of the anorexic action of MJ 9184. This test involves the comparison of the food consumption of groups of fasted rats during a 4-hr. feeding period normally, and after intraperitoneal injection of a selected dose of the test drug prior to feeding. Amphetamine sulfate, a widely used anorexic substance, at a dose of 2.2 mg./kg. reduces food consumption to ½ of normal. A 50% reduction of food consumption is achieved at a dose of 0.25 mg./kg. of MJ 9184 hydrochloride.

MJ 9184 hydrochloride is a relatively non-toxic substance, the $LD_{60}$ being in excess of 6000 mg./kg. for mice treated orally, greater than 4000 mg./kg. for rats treated orally, and 304 mg./kg. for mice treated intraperitoneally. Cats tolerate doses of 256 mg./kg. orally with only mild signs, but no lethality.

MJ 9184 and its pharmaceutically acceptable salts are administered to mammals subject to bronchoconstriction or to reduce the food intake of obese mammals at doses in the range of 2 mcg./kg. to 1 mg./kg. of body weight. The substances may be administered orally, parenterally, or by inhalation, the latter being of interest for bronchodilator use. The usual human dose is 2 to 20 mcg./kg. of body weight 1 to 4 times a day. Suitable dosage compositions are described below.

The present invention includes the pharmaceutically acceptable metal and acid addition salts of MJ 9184. Examples of metal salts include the sodium, potassium, calcium, magnesium, aluminum, and zinc salts. The sulfonanilide group is the acidic function which is neutralized in forming metal salts. Acid addition salts are formed at the amino group. Examples of pharmaceutically acceptable acid addition salts are the hydrochloride, hydrobromide, sulfate, phosphate, nitrate, mucate, isethionate, acetate, propionate, gluconate, benzoate, mesylate, tosylate, etc. Both types of salts can be prepared by reaction, preferably in solution of chemically equivalent amounts of MJ 9184 and the desired acid or base. They may be prepared by metathesis, preferably in a liquid reaction medium. A number of the acid addition salts including the hydrochloride salt have very low solubilities. The isethionate salt is notable for its water solubility and is particularly suited for parenteral formulations and for the preparation of solutions for nebulization. The term pharmaceutically acceptable used with reference to the salts implies a lack of toxicity in the doses required for the intended uses, and the possession of physical properties adapting the substances for one or more of the intended uses.

EXAMPLE 1

2′-hydroxy-5′-[1-hydroxy - 2 - (2-methyl - 1 - phenyl-2-propylamino)-ethyl]methanesulfonanilide hydrobromide (A) 2′-hydroxy-5′-[N-(2-methyl - 1 - phenyl-2-propyl)glycyl]-methanesulfonanilide hydrobromide.—To a solution of α-α-dimethylphenethylamine (120 g., 0.8 mole) in 1.1 liter of acetonitrile is added 5′-bromoacetyl-2′-hydroxymethanesulfonanilide (108 g., 0.35 mole) in a period of 5 minutes. The resulting solution is refluxed for 5 minutes on a steam bath and then permitted to stand for 25 minutes at room temperature after which it is chilled and acidified with 5 N ethanolic hydrogen bromide. The acidified mixture is concentrated under reduced pressure until a thick slurry is obtained. After standing overnight at room temperature, the slurry is filtered and the crude product triturated with 2-butanone, filtered, washed with 2-butanone and dried to afford 86.3 g., (54% yield), M.P. 217.5–221° C. (dec.).

(B) 2′-hydroxy-5′-[1-hydroxy - 2 - (2-methyl-1-phenyl-2 - propylamino)ethyl]methanesulfonanilide hydrobromide.—2′ - hydroxy-5′-[N-(2-methyl-1-phenyl-2-propyl) glycyl]methanesulfonanilide hydrobromide (132 g., 0.29 mole) is dissolved in 2 liters of hot methanol, the methanolic solution is allowed to cool to room temperature and 13 g. of 10% palladium-on-carbon catalyst suspended in 50 ml. of water is added. Hydrogenation of the stirred mixture is carried out under 1–3 atm. of pressure for 17 hr. during which time 0.31 mole of hydrogen is absorbed. The catalyst is filtered and the filtrate concentrated under reduced pressure until a thick slurry is obtained. Isopropanol is added to the slurry and the mixture is again concentrated in vacuo to remove water by azeotropic distillation. Trituration of the residual solid with 2-propanol and collection on a filter affords 100.5 g. (76% yield) of the desired product, M.P. 194.5–195.5° C. (dec.).

EXAMPLE 2

2′-hydroxy-5′-[1-hydroxy - 2 - (2-methyl-1-phenyl-2-propylamino) - ethyl]methanesulfonanilide base (MJ 9184).—2′-hydroxy - 5′ - [1-hydroxy - 2 - (2-methyl-1-phenyl-2-propylamino)ethyl]methanesulfonanilide hydrobromide (Example 1B), 47.7 g. is refluxed with 100 ml. of methanol. The material only partially dissolves. A solution of 6.5 g. of potassium hydroxide in 25 ml. of methanol is then added to the suspension followed by 1 l. of water. The mixture is thoroughly stirred and cooled to 5–10° C. The precipitate is collected on a filter and washed with water until a negative test for bromide using silver nitrate is obtained. The product is dried in an oven at 65° C., yield 36 g.

EXAMPLE 3

2′-hydroxy - 5′ - [1-hydroxy - 2 - (2-methyl-1-phenyl-2-propylamino) - ethyl]methanesulfonanilide hydrochloride.—2′-hydroxy-5′-[1-hydroxy - 2 - (2-methyl-1-phenyl-2 - propylamino)ethyl]methanesulfonanilide base (Example 2), 20 g. (0.053 mole) is suspended in 50 ml. of methanol and acidified with 250 ml. of 5 N ethanolic hydrogen chloride (0.12 mole). The mixture is stirred for 2 hrs. and then the solvent is distilled at reduced pressure until a solid residue is obtained. The residue is triturated with isopropanol and collected on a filter. It is recrystallized from equal volumes of dimethylformamide and isopropyl ether, yield 17.1 g., M.P. 215–216° C. (dec.).

Analysis.—Calcd. for $C_{19}H_{27}ClN_2O_4S$ (percent): C, 54.99; H, 6.56; N, 6.75; S, 7.73. Found (percent): C, 55.12; H, 6.72; N, 6.96; S, 7.70.

EXAMPLE 4

2′ - hydroxy - 5′ - [1 - hydroxy - 2 - (2 - methyl - 1-phenyl - 2 - propylamino)ethyl]methanesulfonanilide isethionate.—2′ - hydroxy - 5′ - [1 - hydroxy - 2 - (2-methyl -1 - phenyl - 2 - propylamino)ethyl]methanesulfonanilide base (Example 2), 5.7 g. (0.015 mole) and 2.4 g. (0.019 mole) of isethionic acid is dissolved in 20 ml. of warm absolute methanol. The warm solution is treated with decolorizing carbon, filtered and the filtrate mixed with diisopropyl ether. On chilling, a precipitate forms which is collected, yield 4.0 g., M.P. 148–152° C. This material is dissolved in 15 ml. of absolute methanol, the warm solution treated with decolorizing carbon, the carbon removed by filtration, and the filtrate dilute to 20 ml. with diisopropyl ether, yield 2.8 g., M.P. 155.5–157.5° C. (corr.).

Analysis.—Calcd. for $C_{19}H_{26}N_2O_4S \cdot C_2H_6O_4S$ (percent): C, 49.98; H, 6.39; N, 5.55. Found (percent): C, 49.61; H, 6.45; N, 5.46.

EXAMPLE 5

2′ - hydroxy-5′ - [1 - hydroxy - 2 - (2 - methyl - 1-phenyl - 2 - propylamino)ethyl]methanesulfonanilide sodium salt.—A solution of sodium methoxide prepared from 0.23 g. (0.01 gram atom) of sodium and 12 ml. of methanol is mixed with a solution of 3.78 g. (0.01 mole) of 2′-hydroxy-5′-[1-hydroxy-2-(2-methyl-1-phenyl-2-propylamino)ethyl]methanesulfonanilide base (Example 2) in 125 ml. of methanol, and then an equal volume of anhydrous ether is added. The precipitated sodium salt is collected on a filter, washed with a fresh portion of the same solvent mixture and dried.

Substitution of other bases for sodium methoxide in the foregoing example may be employed to provide other metal salts. Metathetical processes in which the sodium salt prepared in the foregoing example is allowed to react in solution with a metal salt such as magnesium chloride, calcium chloride, barium chloride, or zinc chloride are also suitable for preparation of other metal salts.

EXAMPLE 6

Capsules.—The following ingredients are blended in a twin blender and then loaded into No. 4 two-piece hard gelatin capsules. The batch size is sufficient for 1000 capsules and provides for a fill weight of 160 mg. supplying 0.5 mg. of active ingredient per capsule.

| | G. |
|---|---|
| 2' - hydroxy - 5' - [1 - hydroxy - 2 - (2 - methyl - 1 - phenyl - 2 - propylamino)ethyl]methane - sulfonailide hydrochloride | 0.5 |
| Lactose, impalpable | 159.5 |

By adjusting the ingredient weights, capsules containing from 0.2 mg. to 2.0 mg. of active ingredient may be prepared in the same fashion.

EXAMPLE 7

Tablets.—The following ingredients when thoroughly blended in the dry state in a twin shell blender provide a composition suitable for tableting in a standard tablet press using a ¼ inch concave die. The batch size is sufficient for 1000 tablets containing 0.2 mg. of active ingredient per tablet.

| | G. |
|---|---|
| 2' - hydroxy - 5' - [1 - hydroxy - 2 - (2 - methyl - 1 - phenyl - 2 - propylamino)ethyl]methansulfonanilide hydrochloride | 0.2 |
| Sucrose, pregranulated for direct compression | 77.3 |
| Corn starch | 2.0 |
| Crystalline cellulose | 20.0 |
| Magnesium stearate | 0.5 |

EXAMPLE 8

Solution for nebulization.—The following ingredients are used to prepare a solution which clarified by filtration and then filled into 10 ml. amber glass bottles.

| | G. |
|---|---|
| 2' - hydroxy-5'-[1-hydroxy-2-(2-methyl-1-phenyl-2-propylamino)ethyl]methanesulfonanilide isethionate | 13.33 |
| Sodium bisulfite | 2.00 |
| Chlorobutanol, USP | 5.00 |
| Propylene glycol | 50.00 |
| Sodium saccharin | 1.00 |
| Citric acid, anhydrous | 1.92 |
| Purified water, q.s. 1000 ml. | |
| Sodium hydroxide, q.s. pH 3.75. | |

The foregoing solution is suitable for administration in conventional nebulization equipment adapted for administration of drugs by inhalation. This solution contains 1.33% by weight of the isethionate salt equivalent to 1% by weight of MJ 9184 base. The concentration of active ingredients may be varied to provide similar solutions containing an amount of the isethionate salt equivalent to from 0.25 to 2% by weight of MJ 9184 base.

EXAMPLE 9

Aerosol Dispenser.—A solution of 2.0 g. of 2'-hydroxy-5'-[1-hydroxy-2-(2-methyl-1-phenyl-2-propylamino)ethyl] methanesulfonanilide isethionate in 3735 g. of absolute ethanol and 34.5 g. of distilled water is prepared and used with a propellant blend of 118.0 g. of dichlorodifluoromethane and 472.0 g. of dichlorotetrafluoroethane to fill aerosol containers to a total fill weight of 17.5 g. each. The containers are equipped with pharmaceutical grade metering valves of 50 mg. delivery capacity. Each actuation thus releases 100 mcg. of MJ 9184 isethionate equivalent to 75 mcg. of MJ 9184 base.

What is claimed is:
1. A compound selected from the group consisting of 2' - hydroxy - 5'-[1-hydroxy-2-(2-methyl-1-phenyl-2-propylamino)ethyl]-methanesulfonanilide and the pharmaceutically acceptable acid addition and metal salts thereof.
2. 2'-hydroxy-5'-[1-hydroxy-2-(2-methyl-1-phenyl-2-propylamino)ethyl]methanesulfonanilide.
3. The hydrobromide salt of the compound of claim 2.
4. The hydrochloride salt of the compound of claim 2.
5. The isethionate salt of the compound of claim 2.
6. The sodium salt of the compound of claim 2.

References Cited

UNITED STATES PATENTS

| 3,341,584 | 9/1967 | Larsen et al. | 260—556 A |
| 3,634,511 | 1/1972 | Howe et al. | 260—556 A |

OTHER REFERENCES

J. Med. Chem. 10: 462–472 (1967) Larsen et al.

HENRY R. JILES, Primary Examiner

S. D. WINTERS Assistant Examiner

U.S. Cl. X.R.

424—321, 316; 260—556 A